US012229815B2

(12) United States Patent
Ni et al.

(10) Patent No.: US 12,229,815 B2
(45) Date of Patent: Feb. 18, 2025

(54) METHOD, DEVICE, AND COMPUTER PROGRAM PRODUCT FOR USER BEHAVIOR PREDICTION

(71) Applicant: EMC IP Holding Company LLC, Hopkinton, MA (US)

(72) Inventors: Jiacheng Ni, Shanghai (CN); Jinpeng Liu, Shanghai (CN); Danqing Sha, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 617 days.

(21) Appl. No.: 17/403,067

(22) Filed: Aug. 16, 2021

(65) Prior Publication Data
US 2023/0041339 A1 Feb. 9, 2023

(30) Foreign Application Priority Data
Jul. 23, 2021 (CN) .......................... 202110836899.0

(51) Int. Cl.
*G06Q 30/00* (2023.01)
*G06N 3/04* (2023.01)
*G06N 3/082* (2023.01)
*G06Q 30/0202* (2023.01)
*G06Q 30/0601* (2023.01)

(52) U.S. Cl.
CPC ........... *G06Q 30/0631* (2013.01); *G06N 3/04* (2013.01); *G06N 3/082* (2013.01); *G06Q 30/0202* (2013.01)

(58) Field of Classification Search
CPC ............................................... G06Q 30/06–08
See application file for complete search history.

(56) References Cited

U.S. PATENT DOCUMENTS

| 10,354,184 | B1* | 7/2019 | Vitaladevuni | ...... G06Q 30/0201 |
| 10,482,482 | B2* | 11/2019 | Bilenko | ............ G06Q 30/0202 |
| 2019/0205759 | A1* | 7/2019 | Zhang | ....................... G06N 3/10 |
| 2019/0385212 | A1* | 12/2019 | DeLuca | ............. G06Q 30/0631 |
| 2020/0134696 | A1* | 4/2020 | Lardeux | ............. G06Q 30/0254 |
| 2021/0216902 | A1* | 7/2021 | Sutcher-Shepard | ... G06N 20/00 |

OTHER PUBLICATIONS

H. B. McMahan et al., "Communication-Efficient Learning of Deep Networks from Decentralized Data," arXiv:1602.05629v3, Feb. 28, 2017, 11 pages.

(Continued)

*Primary Examiner* — Ethan D Civan
(74) *Attorney, Agent, or Firm* — Ryan, Mason & Lewis, LLP (57) ABSTRACT

Embodiments of the present disclosure relate to a method, a device, and a computer program product for user behavior prediction. In some embodiments, at a client, a first user behavior embedding engine in the client generates behavior prediction information of a target user based on feature information of the target user. The client sends the behavior prediction information of the target user to a server, and receives information about a target item recommended for the target user from the server. Such method enables user privacy-related information to be processed only locally, thereby not only ensuring user privacy and security, but also significantly reducing overall resource overhead.

13 Claims, 8 Drawing Sheets

(56) References Cited

OTHER PUBLICATIONS

K. Bagheri Fard et al., "Recommender System Based on Semantic Similarity," International Journal of Electrical and Computer Engineering, vol. 3, No. 6, Dec. 2013, pp. 751-761.
Z. Xu et al, "Tag-Aware Personalized Recommendation Using a Deep-Semantic Similarity Model with Negative Sampling," Proceedings of the 25th ACM International on Conference on Information and Knowledge Management, Oct. 2016, 4 pages.
Wikipedia, "Federated Learning," https://en.wikipedia.org/wiki/Federated_learning, Jul. 16, 2021, 11 pages.

* cited by examiner

METHOD, DEVICE, AND COMPUTER PROGRAM PRODUCT FOR USER BEHAVIOR PREDICTION

RELATED APPLICATION(S)

The present application claims priority to Chinese Patent Application No. 202110836899.0, filed Jul. 23, 2021, and entitled "Method, Device, and Computer Program Product for User Behavior Prediction," which is incorporated by reference herein in its entirety.

FIELD

Embodiments of the present disclosure relate to the field of information management, and in particular, to a method, a device, and a computer program product for user behavior prediction.

BACKGROUND

With the development of the Internet, the rise of e-commerce has changed shopping habits of most people, and the construction of e-commerce platforms has brought new development opportunities for many small and medium-sized enterprises. In order to improve key performance indicators such as user retention rate and conversion rate, an item recommendation mechanism has gradually become the core of enterprise competition.

In addition, mobile devices such as mobile phones, tablet computers, and smart watches have gradually become major computing devices, and have become increasingly indispensable in daily information transmission. Because of a large number of interactions with users and powerful sensors, these devices store a large amount of valuable private data. Effective use based on the data can significantly improve the availability and efficiency of smart applications. However, at the same time, sensitivity of the data means that there are also some risks and responsibilities, and user privacy issues are particularly worthy of attention. In order to protect the privacy of users, federated learning came into being. Federated learning allows all processing of user data to be performed locally, thereby protecting user privacy to the greatest extent. However, federated learning brings great complexity to implementations at clients while ensuring user privacy.

SUMMARY

In general, embodiments of the present disclosure provide a method, a device, and a computer program product for recommending an item to a user based on user behavior prediction.

In a first aspect, a method implemented at a client is provided in the embodiments of the present disclosure. In the method, at the client, a first user behavior embedding engine in the client generates behavior prediction information of a target user based on feature information of the target user. Then, the client sends the behavior prediction information of the target user to a server. Thereafter, the client receives information about a target item recommended for the target user from the server.

In a second aspect, a method implemented at a server is provided in the embodiments of the present disclosure. In the method, the server receives behavior prediction information of a target user from a client. Then, at the server, a second item embedding engine in the server generates recommendation information about a group of items based on feature information of the group of items. Thereafter, at the server, a target item recommended for the target user is determined from the group of items based on the behavior prediction information of the target user and the recommendation information about the group of items. Then, the server sends information about the target item to the client.

In a third aspect, a device implemented at a client is provided in the embodiments of the present disclosure. The device includes a processor and a memory storing computer-executable instructions. The computer-executable instructions, when executed by the processor, cause the device to perform actions including: generating, by a first user behavior embedding engine in the client, behavior prediction information of a target user based on feature information of the target user; sending the behavior prediction information of the target user to a server; and receiving information about a target item recommended for the target user from the server.

In a fourth aspect, a device implemented at a server is provided in the embodiments of the present disclosure. The device includes a processor and a memory storing computer-executable instructions. The computer-executable instructions, when executed by the processor, cause the device to perform actions including: receiving behavior prediction information of a target user from a client; generating, by a second item embedding engine in the server, recommendation information about a group of items based on feature information of the group of items; determining, based on the behavior prediction information of the target user and the recommendation information about the group of items, a target item recommended for the target user from the group of items; and sending information about the target item to the client.

In a fifth aspect, a computer program product is provided in the embodiments of the present disclosure. The computer program product is tangibly stored on a non-transitory computer-readable medium and includes machine-executable instructions. The machine-executable instructions, when executed, cause a machine to perform the method according to the first aspect.

In a sixth aspect, a computer program product is provided in the embodiments of the present disclosure. The computer program product is tangibly stored on a non-transitory computer-readable medium and includes machine-executable instructions. The machine-executable instructions, when executed, cause a machine to perform the method according to the second aspect.

It should be understood that the content described in this Summary is neither intended to limit key or essential features of the embodiments of the present disclosure, nor intended to limit the scope of the present disclosure. Other features of the present disclosure will become readily understood from the following description.

BRIEF DESCRIPTION OF THE DRAWINGS

The above and other features, advantages, and aspects of the embodiments of the present disclosure will become more apparent with reference to the accompanying drawings and the following detailed description. In the accompanying drawings, identical or similar reference numerals represent identical or similar elements, in which.

In all the accompanying drawings, identical or similar reference numerals indicate identical or similar elements.

DETAILED DESCRIPTION

The principles and spirit of the present disclosure will be described below with reference to several example embodiments shown in the accompanying drawings. It should be understood that these specific embodiments are described only for the purpose of enabling a person skilled in the art to better understand and then implement the present disclosure, rather than limiting the scope of the present disclosure in any way.

As used herein, the term "include" and similar terms thereof should be understood as open-ended inclusion, that is, "including but not limited to." The term "based on" should be understood as "based at least in part on." The term "an embodiment" or "the embodiment" should be construed as "at least one embodiment." The terms "first," "second," and the like may refer to different or identical objects. Other explicit and implicit definitions may also be included below.

As used herein, the term "determine" encompasses a variety of actions. For example, "determine" may include operating, computing, processing, exporting, surveying, looking up (for example, looking up in a table, a database, or another data structure), identifying, and the like. In addition, "determine" may include receiving (for example, receiving information), accessing (for example, accessing data in a memory), and the like. In addition, "determine" may include parsing, selecting, choosing, establishing, and the like.

The term "client" or "client device" as used herein refers to an apparatus or device used for information processing on a user side. As an example, the example of the client or the user terminal may include and generally refer to portable computing devices, including but not limited to the following types of devices: mobile stations (mobile phones), smart phones, smart watches, personal digital assistants (PDAs), mobile phones, devices using wireless modems (alarm or measuring devices, etc.), laptop computers and/or touch screen computers, tablet computers, game consoles, notebooks and multimedia devices, etc.

The term "server" or "server device" used herein refers to an apparatus or device that provides computing or services to other clients (terminal or devices such as mobile stations, smart phones, smart watches, personal digital assistants (PDAs), mobile phones, devices using wireless modems, laptop computers and/or touch screen computers, tablet computers, game consoles, notebooks and multimedia devices, etc.) in a network.

The term "neural network" used herein may be understood as a machine learning model. The model can learn correlation between corresponding input and output from training data, so that after the training is completed, the model processes a given input based on a parameter value set obtained from the training to generate a corresponding output. The "neural network" may sometimes be referred to as a "neural network model," a "learning network," a "learning model," a "network," or a "model." These terms are used interchangeably herein.

Machine learning may be divided into three stages, namely, a training stage, a testing stage, and an application stage (also referred to as an inference stage). In the training stage, a given learning model may be trained by using a large amount of training data, and iterate and update values of a parameter set of the model continuously until the model can reach an expected objective. After training, the values of the parameter set of the machine learning model are determined. In the testing stage, the trained learning model may be tested by using test samples to determine the performance of the learning model. In the application stage, actual input data may be applied to the trained learning model. The learning model can process actual input data based on the parameter set obtained from training, so as to provide a corresponding output.

As mentioned above, in order to protect the privacy of users, a federated learning mechanism has been proposed in recent years. The federated learning mechanism aims to implement high-efficiency machine learning among multiple participants or multiple computing nodes under the premise of ensuring information security during data exchange, protecting terminal data and personal data privacy, and ensuring legal compliance. To facilitate the understanding of the description below, the federated learning mechanism is introduced first.

In the federated learning mechanism, a server provides a globally shared model, and a client downloads the model and trains its own data set, while updating model parameters. In each communication between a server and a client, the server distributes current model parameters to the client (that is, the client downloads the model parameters from the server). After the client trains the model locally, it will return the updated model parameters to the server, and then the server aggregates multiple model parameters received from multiple clients by using a certain aggregation method to obtain aggregated model parameters, and sends them back to the client. The process is repeated like this. Under a federated learning framework, the model training process is performed separately at each client, that is, data related to user privacy may be processed locally, and user privacy can be well protected.

For example, a FedAvg (FederatedAveraging) algorithm may be used to perform the federated learning process. The overall process of the FedAvg algorithm is as follows:

Client selection: The server selects some clients meeting conditions.

Broadcast: The selected clients download the latest model parameters and training programs from the server.

Client computing: Each selected client uses local data to compute and update model parameters.

Aggregation: The server collects and aggregates updated models of various clients.

Model update: The server updates the local model.

Specific steps may be obtained with reference to Algorithm 1 below. In the training process of federated learning using the FedAvg algorithm, model parameters are initialized first; then, a single round of model aggregation is performed, and multiple clients are randomly selected from all clients; training is performed on each client based on initial settings to obtain new model parameters; then, the models of the multiple clients are averaged to obtain the aggregated model parameters; and the steps are repeated to perform the next round of model aggregation.

---
Algorithm 1 FederatedAveraging.
---
The server executes:
Initialization $w_0$
for each round t = 1, 2, . . . do
   m ← max(C · K, 1)
   $S_t$ ← ( random sets in m clients )
   for each client k ∈ $S_t$ in parallel do
     $w_{t+1}^k$ ← ClientUpdate(k, $w_t$)

$$w_{t+1} \leftarrow \sum_{k=1}^{K} \frac{n_k}{n} w_{t+1}^k$$

ClientUpdate(k, w): // running on the client k
   $\mathcal{B}$ ← ( $\mathcal{P}_k$ is divided into multiple batches in a size of B )
   for each local round i from 1 to E do
     for batch b ∈ $\mathcal{B}$ do
       w ← w − η∇ℓ(w; b)
   return w to the server
---

K clients are indexed by k;
B is the size of local small batches;
E is the number of local rounds; and
η is a learning rate With regard to the user-oriented item recommendation problem, it is expected that the privacy of user data can be ensured, while accurate recommendation to users can be made with low implementation complexity.

According to an embodiment of the present disclosure, an improved solution for recommending an item to a user based on user behavior prediction is provided. In this solution, the module or engine used for recommending an item to the user is decomposed into a user behavior embedding engine and an item embedding engine. In the application stage, the user behavior embedding engine is deployed on a client, the item embedding engine is deployed on a server, and then the item recommendation to the user is implemented based on the two engines.

According to this solution, at the client, a first user behavior engine generates, based on feature information of a target user of item recommendation, behavior prediction information of the target user. The client sends the generated behavior prediction information to the server, so as to perform item recommendation for the target user. Then, the client receives information of a target item recommended for the target user from the server.

The feature information of the user includes any appropriate information used to represent a personal feature of the user, for example, the user's age, the user's region, the user's occupation, some historical behaviors of the user (such as browsing history and purchase history), and so on. The behavior of the user, for example, the preference of the user for a certain item (such as a commodity, restaurant, and place) may be predicted based on the personal feature information of the user.

The feature information of the user often involves privacy of the user, so the protection of user privacy in the process of e-commerce item recommendation is particularly worthy of attention. By locally generating the behavior prediction information based on the feature information of the target user, and then only transmitting the behavior prediction information thereof to the server for subsequent related processing, the data related to the privacy of the target user can be processed locally, thus solving the problem of privacy leakage.

Correspondingly, the server receives the behavior prediction information of the target user from the client of the target user of the item recommendation. At the server, a second item embedding engine in the server generates recommendation information about a group of items based on feature information of the group of items, for pushing an item to the target user in connection with the above behavior prediction information of the target user. At the server, the target item recommended for the target user is determined from the group of items based on the behavior prediction information of the target user and the recommendation information about the group of items. The server sends information about the target item to the client.

The feature information of the item refers to some information related to the item, such as a category of the item, a standard level of the item, and a comment of the item. Since the feature information of the item does not involve privacy issues, the processing related to the information of the item can be placed in the cloud. In this way, it is possible not to consume the local resources that are sparse at the client, but to use sufficient resources in the cloud to process item-related information and to recommend a related item to the target user.

Using the solution of the present disclosure, by deploying the user behavior embedding engine on the client, data related to the privacy of the user may be processed at the client to protect the privacy and security of user data, and by deploying the item embedding engine on the server, sufficient resources of the cloud can be fully utilized to process the item-related information, which can reduce the overall computational complexity while protecting the user privacy.

The principles and example implementations of the present disclosure will be described in detail below with reference to the accompanying drawings.

Figure 1:
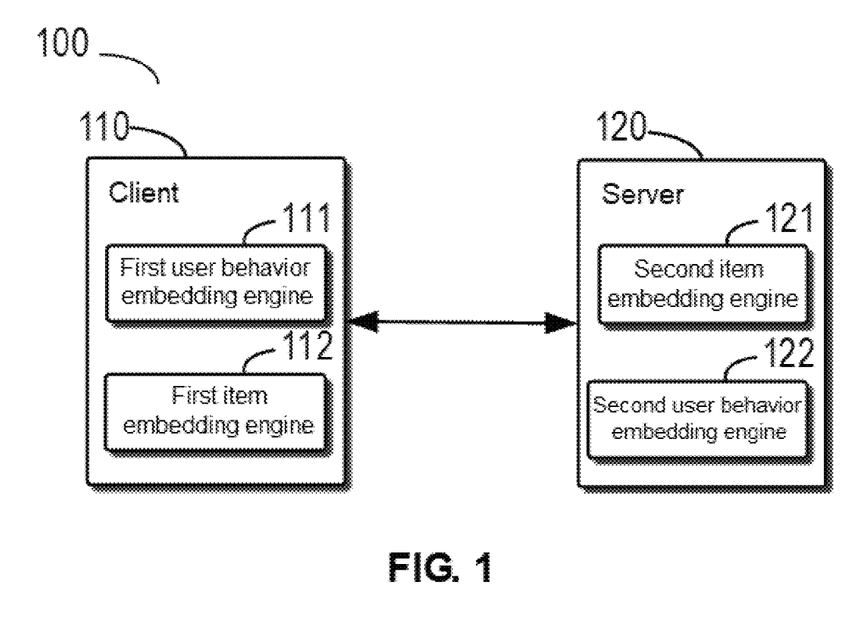
FIG. 1 shows a schematic diagram of a network in which the embodiments described in the present disclosure can be implemented.

Referring to FIG. 1 first, FIG. 1 is a schematic diagram of network 100 in which the embodiments described in the present disclosure may be implemented. Network 100 may be a network via a wired or wireless medium. Network 100 includes multiple devices or apparatuses, such as client 110 and server 120. To simplify the representation, only one client 110 and one server 120 are shown in FIG. 1. It should be understood that the numbers of servers and clients shown in FIG. 1 are given for illustrative purposes. Network 100 may include any suitable numbers of clients 110 and servers 120.

Client 110 and server 120 may communicate with each other in a wired and/or wireless manner. Any communication methods that are currently known and will be developed in the future can be used here, and the scope of the present disclosure is not limited in this aspect.

As shown in FIG. 1, client 110 includes first user behavior embedding engine 111, which is configured to generate behavior prediction information of a user based on feature information of the user. For example, based on feature information of a user who is a male and a historical record of clothing browsed on a webpage, behavior prediction information implicitly predicting that the user wants to buy men's clothing is generated.

Client 110 may also optionally include first item embedding engine 112. First item embedding engine 112 can assist first user behavior embedding engine 111 to perform joint training. In an embodiment of the present disclosure, in an actual application stage of item recommendation, first item embedding engine 112 may not participate in the item recommendation process. In the actual application stage, server 120 performs the item recommendation.

As shown in FIG. 1, server 120 includes second item embedding engine 121, which is configured to generate recommendation information of an item based on feature information of the item. For example, based on feature information with a category of a product being clothing and a target age range of the item being the youth, recommendation information implicitly predicting that an applicable object of the product is a young man who wants to buy clothing.

Server 120 may also optionally include second user behavior embedding engine 122. Second user behavior embedding engine 122 can assist in constructing second item embedding engine 121 when interacting with the client. In an embodiment of the present disclosure, in the actual application stage of the item recommendation to the target user, second user behavior embedding engine 122 may not be used to generate behavior prediction information of the target user to push the target item. In the actual application stage, the behavior prediction information of the target user is generated at client 110.

In various embodiments of the present disclosure, first user behavior embedding engine 111 and second user behavior embedding engine 122, as well as first item embedding engine 112 and second item embedding engine 121, may be implemented through software, hardware, firmware, or any appropriate combination thereof. In some embodiments, the aforementioned engines may be implemented by using a neural network.

Figure 2:
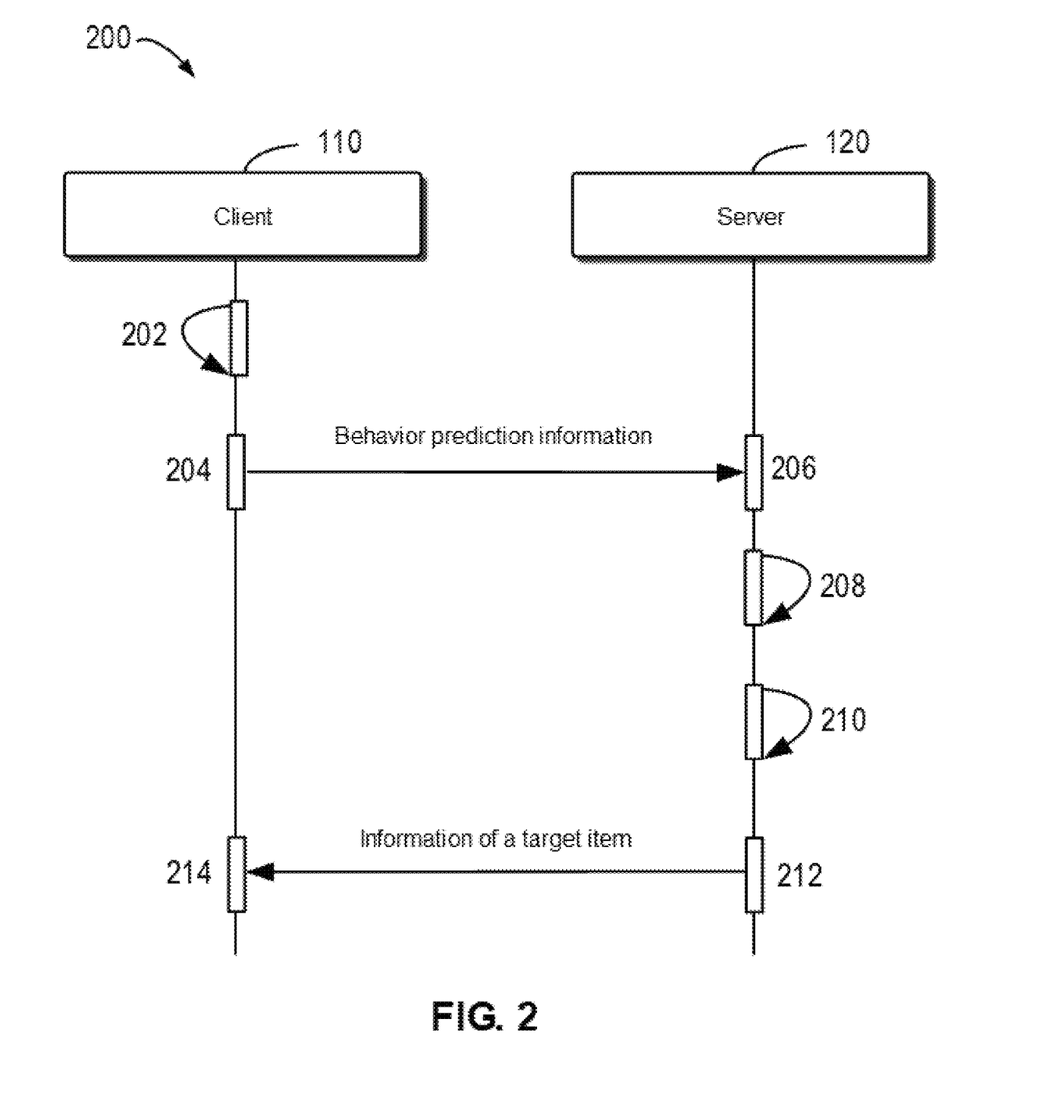
FIG. 2 shows a signaling diagram of an interaction process between a server and a client according to some embodiments of the present disclosure.

FIG. 2 shows interaction process 200 between client 110 and server 120 according to some embodiments of the present disclosure. To facilitate discussion, interaction process 200 will be discussed with reference to FIG. 1.

As shown in FIG. 2, at client 110, first user behavior embedding engine 111 in client 110 generates (202) behavior prediction information of a target user based on feature information of the target user of item recommendation. Information may be represented in a space with multiple dimensions. For example, first user behavior embedding engine 111 may map high-dimensional feature information of a target user to low-dimensional behavior prediction information of the target user. The behavior prediction information of the target user may be used to recommend an item to the target user.

Then, client 110 sends (204) the behavior prediction information of the target user to server 120. Accordingly, server 120 receives (206) the behavior prediction information of the target user from client 110.

Then, at server 120, second item embedding engine 121 generates (208) recommendation information about a group of items based on feature information of the group of items.

For example, second item embedding engine 121 may map high-dimensional feature information of an item to low-dimensional recommendation information of the item. The recommendation information of the item may be used to match the behavior prediction information of the user to recommend the item to the user.

Then, server 120 determines (210) a target item recommended for the target user from the group of items based on the behavior prediction information of the target user and the recommendation information about the group of items. For example, server 120 may separately match the behavior prediction information of the target user with the recommendation information of the group of items, thereby determining one or more items with a relatively high degree of matching as the target item to be recommended to the target user. Then, server 120 sends (212) information about the target item recommended for the target user to client 110. Correspondingly, client 110 receives (214) the information of the target item recommended for the target user from server 120.

In some embodiments, the federated learning method based on the FedAvg algorithm as described above may be used to perform interaction between client 110 and server 120. In the federated learning method, server 120 may interact with multiple clients including client 110, so as to aggregate the user behavior embedding engines and/or item embedding engines trained at the multiple clients. After multiple interactions with these clients, server 120 may finally obtain an aggregated engine for recommending an item to the target user. Only parameter information of the engine is transmitted in the interaction between client 110 and server 120, and therefore, the privacy protection of the user can be well realized.

Before the federated learning method is used to perform engine interaction between client 110 and server 120, in some embodiments, client 110 may train a local engine to enable it to realize required functions. In some embodiments, first user behavior embedding engine 111 may be jointly trained with first item embedding engine 112. For example, during the training, first user behavior embedding engine 111 in client 110 may generate behavior prediction information of a reference user based on feature information of the reference user in a training data set, and first item embedding engine 112 may generate recommendation information of a reference item based on feature information of the reference item in the training data set. The behavior prediction information of the reference user and the recommendation information of the reference item may be matched to determine a degree of matching between the behavior prediction information of the reference user and the recommendation information of the reference item based on the two. The determined degree of matching may be compared with a reference degree of matching in the training data set. Furthermore, first user behavior embedding engine 111 and first item embedding engine 112 may be updated based on a comparison result at client 110 to obtain trained first user behavior embedding engine 111 and trained first item embedding engine 112.

In some embodiments, first user behavior embedding engine 111 and first item embedding engine 112 in client 110 may be implemented by deep semantic similarity model (DSSMs). Similarly, second item embedding engine 121 and second user behavior embedding engine 122 in server 120 may also be implemented by DSSMs. A DSSM is a deep neural network (DNN) used to model semantic similarity between a pair of strings. The semantic similarity of sentences is based on similarity of sentence meanings (i.e., semantics). It is a measure of the definition of a set of documents or terms, wherein a distance between a set of documents or terms is based on the similarity of their meanings or semantic contents, rather than an estimated similarity based on grammatical representations thereof (for example, string formats thereof). A DSSM can well capture the semantic similarity, and can be extended to any number of string pairs according to practice. Although DSSMs were originally designed for information acquisition, they may also be used for item recommendation.

Figure 3:
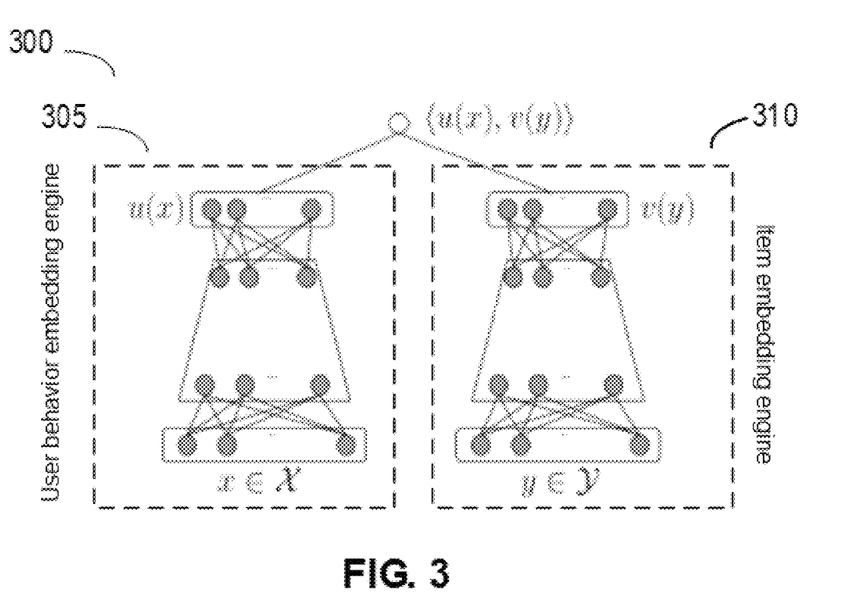
FIG. 3 shows a schematic diagram of a deep semantic similarity model (DSSM) according to some embodiments of the present disclosure.

FIG. 3 shows a schematic diagram of an example DSSM according to an embodiment of the present disclosure.

Classic double tower model 300 of a DSSM as shown may be used at both client 110 and server 120. In the model, left tower 305 (i.e., the neural network on the left) can implement first user behavior embedding engine 111 in client 110, and right tower 310 (i.e., the neural network on the right) can implement first item embedding engine 112. Similarly, at server 120, left tower 305 can implement second user behavior embedding engine 122, and right tower 310 can implement second item embedding engine 121. As can be seen, one advantage of using a DSSM is that the specific structure of the DSSM can realize decoupling of the DSSM into two separate neural networks, so that the solution of the user behavior embedding engine and item embedding engine operating at the client and the server respectively provided in the present disclosure can be implemented.

By taking the training process as an example, a specific implementation of the operation at client 110 according to the present disclosure is discussed below with reference to DSSM.

In an illustrative embodiment, a DSSM uses two character strings as an input, namely, feature information x of the reference user and feature information y of the reference item. When the training data set is obtained, the similarity may be defined by "how much the user likes the item," so a reference degree of matching may be determined by a specific actual indicator (such as a click-through rate). An example of obtaining the training data set is described below. If reference user m checks item i, an instance may be recorded as $<x^m, y^i>$. If reference user m clicks on item i, the instance may be labeled as 1, and the labeled instance may be expressed as ($<x^m, y^i>$, 1). On the contrary, if reference user m does not click on item i, the instance may be labeled as 0, and the labeled instance may be expressed as ($<x^m, y^i>$, 0). In this way, a training data set may be obtained for training the DSSM.

In the DSSM, high-dimensional feature information x of the reference user may be mapped from high-dimensional original space X to low-dimensional behavior prediction information u(x) of the reference user through first user behavior embedding engine 111, and high-dimensional feature information y of the reference item may be mapped from the high-dimensional original space Y to low-dimensional recommendation information v(y) of the reference item through first item embedding engine 112.

Then, it is necessary to perform matching processing on behavior prediction information u(x) of the reference user and recommendation information v(y) of the reference item. In the DSSM matching process, the degree of matching between behavior prediction information u(x) of the reference user and recommendation information v(y) of the reference item may be measured by using the semantic similarity between behavior prediction information u(x) of the reference user and recommendation information v(y) of the reference item. The semantic similarity between behavior prediction information u(x) of the reference user and recommendation information v(y) of the reference item may be expressed by a cosine distance (that is, a cosine similarity) of the two semantic vectors. The DSSM may be updated iteratively by comparing the semantic similarity determined between u(x) and v(y) with the reference degree of matching between the reference user and the reference item in the training data set. In this way, a trained DSSM may be obtained.

After the DSSM has been trained locally, client 110 may start interaction with server 120 based on the federated learning method. For example, client 110 may send a first group of parameters of the DSSM to server 120. Then, server 120 receives the first group of parameters of the DSSM from client 110, and generates an updated second group of parameters by aggregating the first group of parameters with model parameters from other clients. Then, client 110 may receive the updated second group of parameters of the DSSM from server 120, update a local DSSM based on the second group of parameters, and then send another group of locally updated parameters of the DSSM to server 120 to perform the next round of interaction. In this way, aggregated DSSM parameters may be generated between client 110 and server 120, and the aggregated DSSM parameters may be subsequently used at client 110 and server 120 to process the user information and the item information of the item recommendation process. For example, in application, the user behavior embedding engine in the aggregated DSSM may be deployed at client 110, and the item embedding engine in the aggregated DSSM may be deployed at server 120, so that the two can be used in coordination to recommend an item to the target user. In this way, the overall overhead can be reduced while protecting the privacy of user data.

It should be understood that certain embodiments use the federated learning method for discussion, but this is only to enable those of ordinary skill in the art to better understand the principles and ideas of the embodiments of the present disclosure, and is not intended to limit the scope of the present disclosure in any way. In fact, any other applicable training method can be used, or separate training at client 110 and server 120 may also be implemented.

In addition, in the embodiment in which first user behavior embedding engine 111 of client 110 is implemented by a neural network, considering that a large neural network that usually uses multiple layers and nodes, the computational complexity thereof is often very high. Therefore, especially for some real-time applications, reducing storage and computing costs becomes particularly important. To further achieve performance gains, the neural network model of first user behavior embedding engine 111 may be compressed. On the server side, it is not necessary to compress the neural network model of second item embedding engine 121 since there are sufficient resources available.

In some embodiments, a pruning method may be used to compress the neural network model of first user behavior embedding engine 111. The pruning process will be described below with reference to FIG. 4A and FIG. 4B.

Figure 4A:
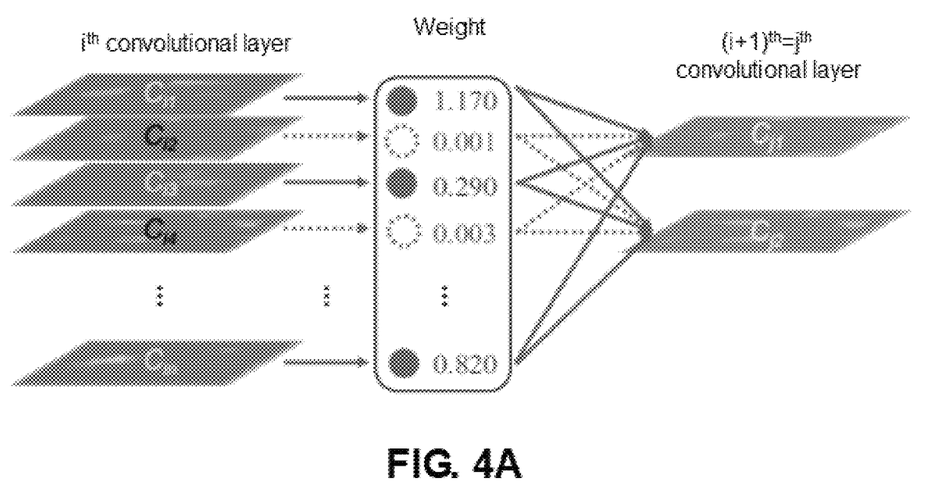
FIG. 4A shows a schematic diagram of an unpruned neural network model according to some embodiments of the present disclosure.
Figure 4B:
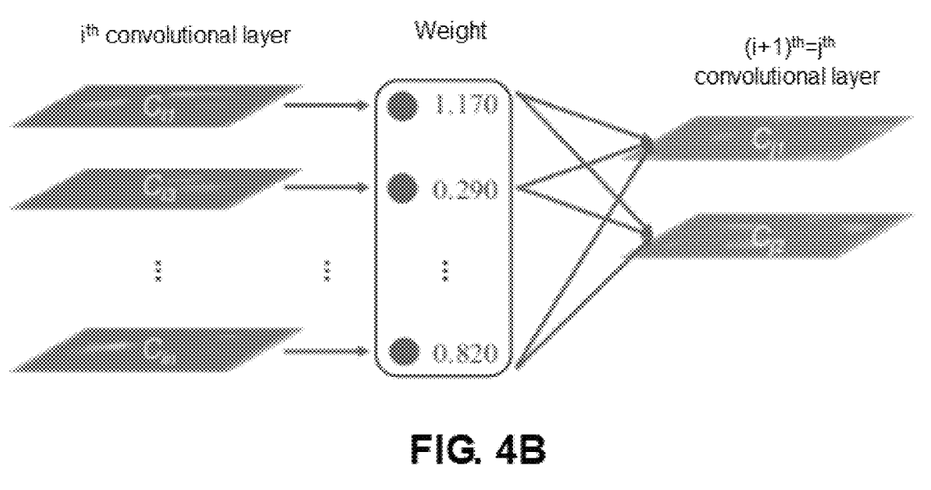
FIG. 4B shows a schematic diagram of a pruned neural network model according to some embodiments of the present disclosure.

FIG. 4A shows a schematic diagram of an unpruned neural network model according to some embodiments of the present disclosure, and FIG. 4B shows a schematic diagram of a pruned neural network model according to some embodiments of the present disclosure.

The neural network includes multiple branches, and each of the multiple branches has a weight associated with the influence of the branch on the user behavior prediction. The pruning method makes the neural network model more streamlined by deleting redundant connections existing in the neural network model. The pruning process may delete branches in the multiple branches whose influence on user behavior prediction is lower than a threshold influence based on weights of the branches (the threshold may be defined as any suitable value according to actual needs, and is not limited in the present disclosure here). In some embodiments, it is generally possible to delete some weights (usually with smaller absolute values) that have less influence on the user behavior prediction.

For example, as shown in FIG. 4A, in branches between the $i^{th}$ convolutional layer and the $(i+1)^{th}$ layer of the neural network model, there are some branches that have less influence on the user behavior prediction, and the branches with less influence on the user behavior prediction can be deleted (as shown by the dashed line in FIG. 4A), so that the compressed neural network model shown in FIG. 4B can be obtained. The compressed neural network model may be deployed at client 110 as first user behavior embedding engine 111 for subsequent generation of the behavior prediction information of the target user based on the feature information of the target user, for performing item recommendation to the target user.

Additionally or alternatively, the neural network model of first user behavior embedding engine 111 may be compressed in a quantitative manner. Trained first user behavior embedding engine 111 may be updated by quantizing values of multiple weights of multiple branches, so that the same number of branches can be represented using less memory. One of the conventional quantification methods is to perform quantification by clustering/bundling, that is, by clustering weights in a specific interval to specific values according to specific criteria, so as to use a smaller number of different floating point values to represent more features. Another conventional quantization method is to convert a floating-point weight of a branch to a fixed-point representation through rounding, which can reduce the precision.

After the above compression process, the computational complexity of first user behavior embedding engine 111 is greatly reduced, thereby reducing the computational overhead at client 110. Furthermore, by deploying first user behavior embedding engine 111 with reduced complexity on client 110 for subsequent prediction of user behavior, the overall overhead can be reduced while protecting the user privacy.

Figure 5:
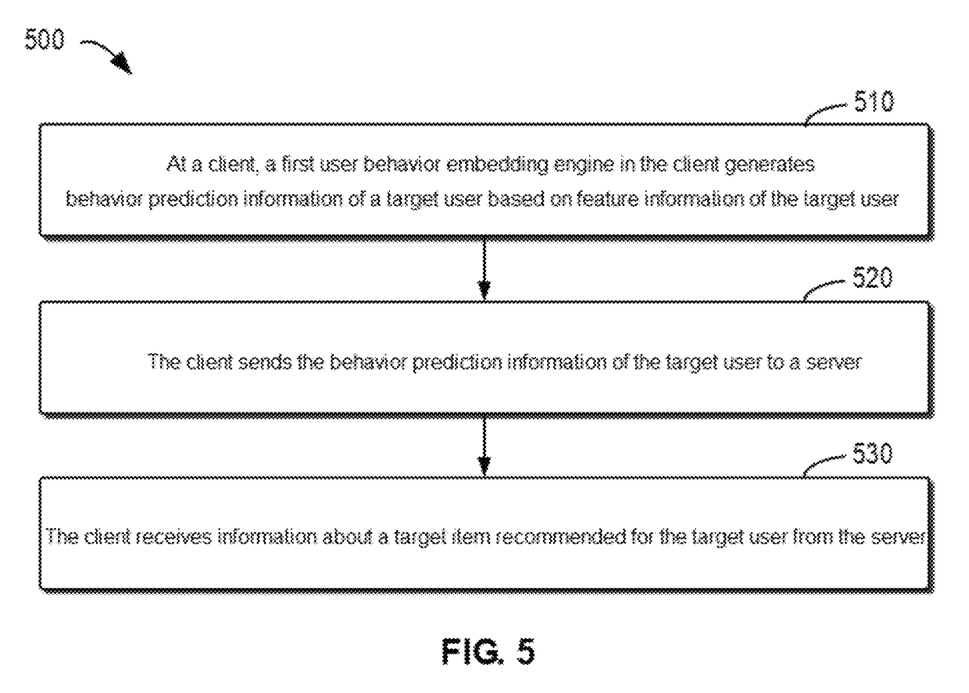
FIG. 5 shows a flowchart of a method implemented at a client according to some example embodiments of the present disclosure.

FIG. 5 shows a flowchart of method 500 implemented at client 110 according to some example embodiments of the present disclosure. As shown in FIG. 5, in block 510, at client 110, first user behavior embedding engine 111 in the client 110 generates behavior prediction information of a target user based on feature information of the target user. In block 520, client 110 sends behavior prediction information of the target user to server 120. In block 530, client 110 receives information about a target item recommended for the target user from the server.

In some embodiments, a training data set is used at client 110 to jointly train first user behavior embedding engine 111 and first item embedding engine 112 in client 110, and first item embedding engine 112 is configured to generate recommendation information of an item based on feature information of the item.

In some embodiments, first user behavior embedding engine 111 at client 110 generates behavior prediction information of a reference user based on feature information of the reference user in the training data set. Moreover, at the client 110, first item embedding engine 112 generates recommendation information of a reference item based on feature information of the reference item in the training data set. At client 110, a degree of matching between the reference user and the reference item is determined based on the behavior prediction information of the reference user and the recommendation information of the reference item. First user behavior embedding engine 111 and first item embedding engine 112 are updated at client 110 based on comparison of the determined degree of matching with a reference degree of matching between the reference user and the target item in the training data set.

In some embodiments, first user behavior embedding engine 111 and first item embedding engine 112 are implemented by a DSSM, and client 110 sends a first group of parameters of the DSSM to the server after training.

In some embodiments, client 110 receives a second group of parameters of the DSSM from the server; and updates the DSSM based on the second group of parameters.

In some embodiments, first user behavior embedding engine 111 is implemented by a neural network. The neural network includes multiple branches, and each branch of the multiple branches has a weight associated with the influence of the branch on user behavior prediction.

In some embodiments, trained first user behavior embedding engine 111 is updated at client 110 by deleting branches in the multiple branches whose influence on the user behavior prediction is lower than a threshold influence based on the multiple weights of the multiple branches.

In some embodiments, trained first user behavior embedding engine 111 is updated at client 110 by quantizing values of the multiple weights of the multiple branches.

Note that the features described above with reference to FIG. 1 to FIG. 4 are all applicable to method 500, and will not be repeated here.

Figure 6:
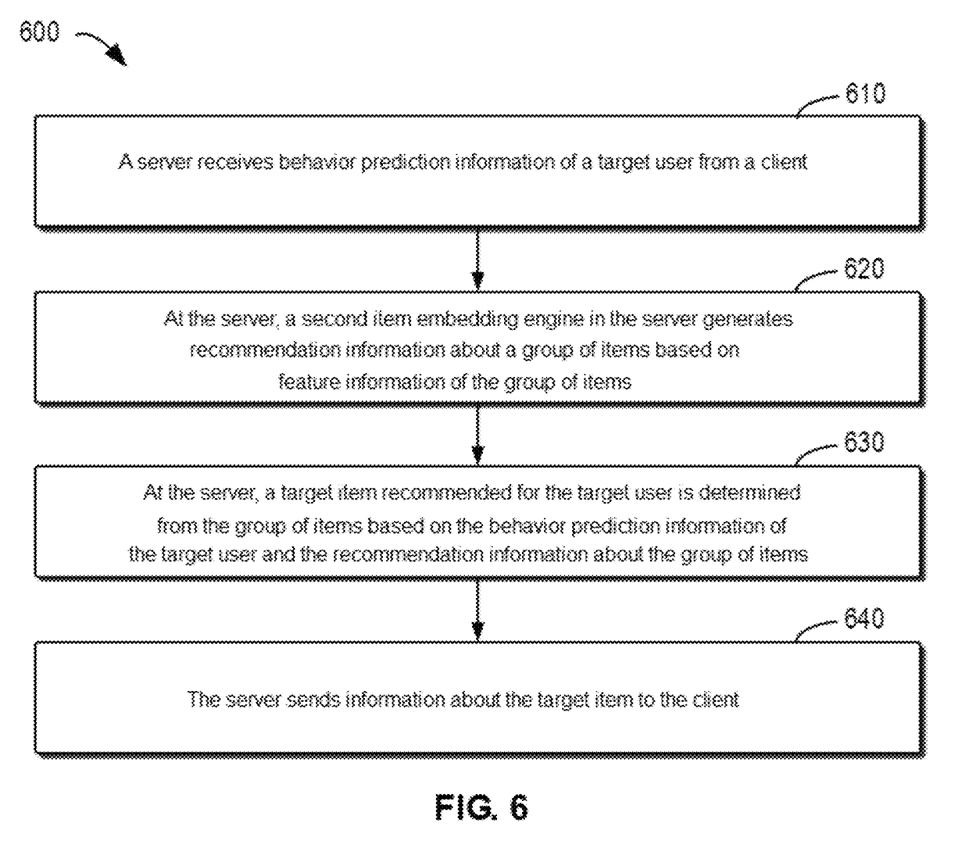
FIG. 6 shows a flowchart of a method implemented at a server according to some example embodiments of the present disclosure.

FIG. 6 shows a flowchart of method 600 implemented at server 120 according to some example embodiments of the present disclosure. As shown in FIG. 6, in block 610, server 120 receives behavior prediction information of a target user from client 110. In block 620, at server 120, a second item embedding engine in the server generates recommendation information about a group of items based on the feature information of the group of items. In block 630, at server 120, a target item recommended for the target user is determined from the group of items based on the behavior prediction information of the target user and the recommendation information about the group of items. In block 640, server 120 sends information about the target item to the client.

In some embodiments, server 120 includes second item embedding engine 121, and second user behavior embedding engine 122 that are implemented by a DSSM. Server 120 receives a first group of parameters of the DSSM from the client and uses the first group of parameters to update the DSSM.

In some embodiments, server 120 sends an updated second group of parameters of the DSSM to the client.

Note that the features described above with reference to FIG. 1 to FIG. 4 are all applicable to the method 600, and will not be repeated here.

Figure 7:
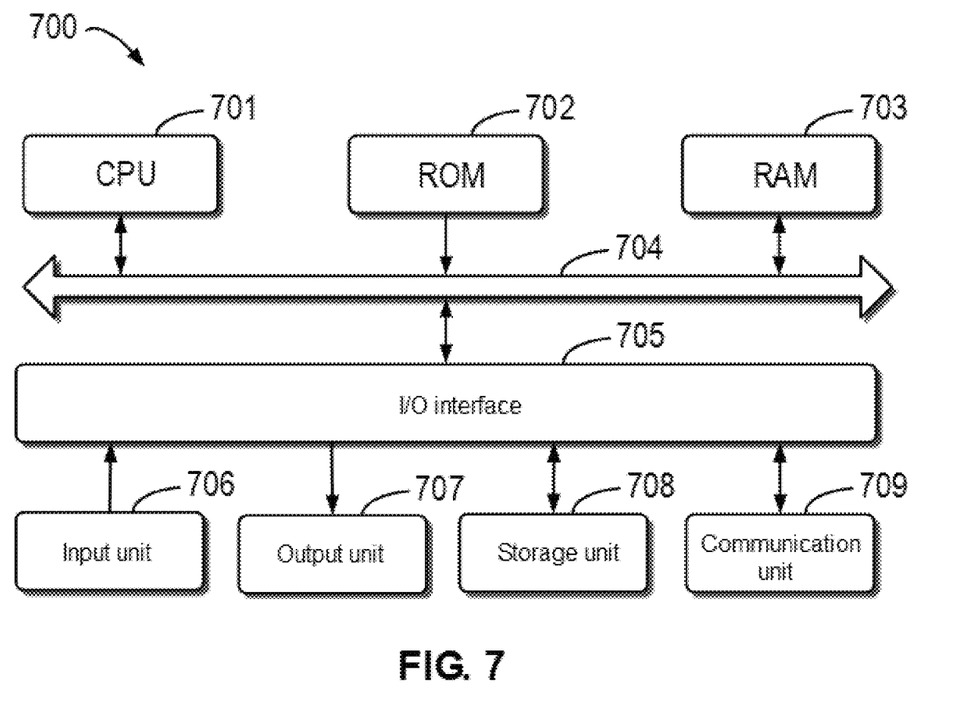
FIG. 7 shows a block diagram of a device suitable for implementing the embodiments of the present disclosure.

FIG. 7 shows a schematic block diagram of device 700 that can be used to implement the embodiments of the present disclosure.

As shown in FIG. 7, device 700 includes a controller or processor, which may be referred to as central processing unit (CPU) 701 that may perform various appropriate actions and processing according to programs stored in read-only memory (ROM) 702 and/or random access memory (RAM) 703. Various programs and data required for the operation of device 700 may be stored in ROM 702 and/or RAM 703. CPU 701, ROM 702, and RAM 703 are connected to one another through bus 704. In particular, device 700 further includes one or more dedicated processing units (not shown) that may also be connected to bus 704.

Input/output (I/O) interface 705 is also connected to bus 704. Multiple components in device 700 are connected to I/O interface 705, including: input unit 706, such as a keyboard and a mouse; output unit 707, such as various types of displays and speakers; storage unit 708, such as a magnetic disk and an optical disc; and communication unit 709, such as a network card, a modem, and a wireless communication transceiver. Communication unit 709 allows device 700 to exchange information/data with other devices via a computer network, such as the Internet, and/or various telecommunication networks. In particular, in an embodiment of the present disclosure, communication unit 709 supports communication with clients or other devices.

In some embodiments, CPU 701 may be configured to execute the various processes and processing described above, such as methods 500 and 600. For example, in some embodiments, methods 500 and 600 may be implemented as a computer software program that is tangibly included in a machine-readable medium such as storage unit 708. In some embodiments, part or all of the computer program may be loaded and/or installed to device 700 via ROM 702 and/or communication unit 709. When the computer program is loaded to RAM 703 and executed by CPU 701, one or more steps of methods 500 and 600 described above may be executed. Alternatively, in other embodiments, CPU 701 may also be configured in any other suitable manner to implement the above processes/methods.

Particularly, according to the embodiments of the present disclosure, the processes described with reference to FIG. 1 to FIG. 6 may be implemented as a computer program product, which may be tangibly stored in a non-transitory computer-readable medium and includes computer-executable instructions. The computer-executable instructions, when executed, cause a device to execute various aspects according to the present disclosure.

The computer-readable storage medium may be a tangible device that can store instructions used by an instruction execution device. For example, the computer-readable storage medium may include, but is not limited to, an electrical storage device, a magnetic storage device, an optical storage device, an electromagnetic storage device, a semiconductor storage device, or any appropriate combination of the above. More specific examples (a non-exhaustive list) of the computer-readable storage medium include: a portable computer disk, a hard disk, a RAM, a ROM, an erasable programmable read only memory (EPROM or flash memory), a static random access memory (SRAM), a portable compact disk read only memory (CD-ROM), a digital versatile disk (DVD), a memory stick, a floppy disk, a mechanical encoding device such as a punch card or a protruding structure within a groove having instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

Computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages, wherein the programming languages include object-oriented programming languages, such as Java, Smalltalk, and C++, and conventional procedural programming languages, such as the "C" language or similar programming languages. Computer-readable program instructions may be executed entirely on a user's computer, partly on a user's computer, as a stand-alone program package, partly on a user's computer and partly on a remote computer, or entirely on a remote computer or server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described herein with reference to block diagrams and/or flowcharts of the device, the method, and the computer program product according to embodiments of the present disclosure. It should be understood that each block in the block diagrams and/or flowcharts as well as a combination of blocks in the block diagrams and/or flowcharts may be implemented by using the computer-readable program instructions.

Various embodiments of the present disclosure have been described for the purpose of example, but the present disclosure is not intended to be limited to the disclosed embodiments. Without departing from the substance of the present disclosure, all modifications and variations fall within the protection scope of the present disclosure defined by the claims.

What is claimed is:

1. A method implemented at a client, comprising:
generating, by a first user behavior embedding engine in the client, behavior prediction information of a target user based on feature information of the target user, wherein the first user behavior embedding engine is implemented by a neural network, and wherein the neural network is compressed at the client;
mapping the feature information of the target user to the behavior prediction information of the target user;
sending the behavior prediction information of the target user to a server, the server comprising at least a second neural network; and
receiving information about a target item recommended for the target user from the server.

2. The method according to claim 1, further comprising:
jointly training the first user behavior embedding engine and a first item embedding engine in the client by using a training data set, wherein the first item embedding engine is used to generate item recommendation information based on feature information of an item.

3. The method according to claim 2, wherein jointly training the first user behavior embedding engine and the first item embedding engine comprises:
generating, by the first user behavior embedding engine, behavior prediction information of a reference user based on feature information of the reference user in the training data set;
generating, by the first item embedding engine, recommendation information of a reference item based on feature information of the reference item in the training data set;

determining a degree of matching between the reference user and the reference item based on the behavior prediction information of the reference user and the recommendation information of the reference item; and updating the first user behavior embedding engine and the first item embedding engine based on comparison of the determined degree of matching with a reference degree of matching between the reference user and the target item in the training data set.

4. The method according to claim 2, wherein the first user behavior embedding engine and the first item embedding engine are implemented by a deep semantic similarity model (DSSM), and the method further comprises:

sending a first group of parameters of the DSSM to the server after the training.

5. The method according to claim 4, further comprising:

receiving a second group of parameters of the DSSM from the server; and updating the DSSM based on the second group of parameters.

6. The method according to claim 2, wherein the neural network comprises multiple branches, and each branch of the multiple branches has a weight associated with an influence of the branch on user behavior prediction.

7. The method according to claim 6, further comprising:

updating the trained first user behavior embedding engine by deleting, based on multiple weights of the multiple branches, branches whose influences on the user behavior prediction are lower than a threshold influence from the multiple branches.

8. The method according to claim 7, further comprising:

updating the trained first user behavior embedding engine by quantizing values of the multiple weights of the multiple branches.

9. A device implemented at a client, comprising:

a processor; and a memory having computer-executable instructions stored therein, wherein the computer-executable instructions, when executed by the processor, cause the device to perform actions comprising:

generating, by a first user behavior embedding engine in the client, behavior prediction information of a target user based on feature information of the target user, wherein the first user behavior embedding engine is implemented by a neural network, and wherein the neural network is compressed at the client;

mapping the feature information of the target user to the behavior prediction information of the target user;

sending the behavior prediction information of the target user to a server, the server comprising at least a second neural network; and receiving information about a target item recommended for the target user from the server.

10. The device according to claim 9, wherein the actions further comprise:

jointly training the first user behavior embedding engine and a first item embedding engine in the client by using a training data set, wherein the first item embedding engine is used to generate item recommendation information based on feature information of an item.

11. The device according to claim 10, wherein jointly training the first user behavior embedding engine and the first item embedding engine comprises:

generating, by the first user behavior embedding engine, behavior prediction information of a reference user based on feature information of the reference user in the training data set;

generating, by the first item embedding engine, recommendation information of a reference item based on feature information of the reference item in the training data set;

determining a matching degree of the reference user and the reference item based on the behavior prediction information of the reference user and the recommendation information of the reference item; and updating the first user behavior embedding engine and the first item embedding engine based on comparison of the determined matching degree with a reference matching degree of the reference user and the target item in the training data set.

12. The device according to claim 10, wherein the first user behavior embedding engine and the first item embedding engine are implemented by a deep semantic similarity model (DSSM), and the actions further comprise:

sending a first group of parameters of the DSSM to the server after the training.

13. A computer program product tangibly stored on a non-transitory computer-readable medium and comprising machine-executable instructions, wherein the machine-executable instructions, when executed, cause a machine to perform the method according to claim 1.

* * * * *